United States Patent
Kallabis

(10) Patent No.: US 7,675,612 B2
(45) Date of Patent: Mar. 9, 2010

(54) LASER MEASURING DEVICE

(75) Inventor: Gabriel Kallabis, Spirkelbach (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 268 days.

(21) Appl. No.: 11/602,492

(22) Filed: Nov. 21, 2006

(65) Prior Publication Data

US 2007/0113412 A1 May 24, 2007

(30) Foreign Application Priority Data

Nov. 21, 2005 (DE) .................. 20 2005 018 286 U

(51) Int. Cl.
*G01B 11/26* (2006.01)
(52) U.S. Cl. ..................................... 356/138
(58) Field of Classification Search .................. 356/138, 356/399
See application file for complete search history.

(56) References Cited

U.S. PATENT DOCUMENTS

| | | | |
|---|---|---|---|
| 5,894,125 A | 4/1999 | Fumio | |
| 6,088,623 A * | 7/2000 | Yowler et al. | 700/56 |
| 6,195,901 B1 * | 3/2001 | Falb | 33/286 |
| 6,373,571 B1 * | 4/2002 | Juhasz et al. | 356/399 |
| 2002/0080342 A1 * | 6/2002 | Kallabis | 356/139.1 |

FOREIGN PATENT DOCUMENTS

| | | |
|---|---|---|
| DE | 3118822 | 2/1982 |
| DE | 3317732 | 12/1983 |
| DE | 4007245 A1 | 9/1991 |
| EP | 1736732 A1 | 12/2006 |
| JP | 2000028359 | 1/2000 |
| WO | 2005/090911 A1 | 9/2005 |

\* cited by examiner

*Primary Examiner*—Tarifur R. Chowdhury
*Assistant Examiner*—Isiaka O Akanbi

(57) ABSTRACT

A laser measuring device (50) including a housing (56) with a laser device present therein for generating and projecting at least one laser beam (52, 54), perpendicular to an alignment surface (34) of the housing, or to a mount (14) that is connected to the housing. In order to enable an exceedingly precise alignment of a laser beam to the center point of an opening in a room boundary, such as the floor, without requiring costly adjustment operations, it is proposed that the alignment surface (34) be equipped with at least three synchronously adjustable positioning elements, which lie in a circle, through the center point of which the laser beam (54), which extends perpendicular to the alignment surface (34), or its extension, passes.

15 Claims, 3 Drawing Sheets

LASER MEASURING DEVICE

Figure 4:
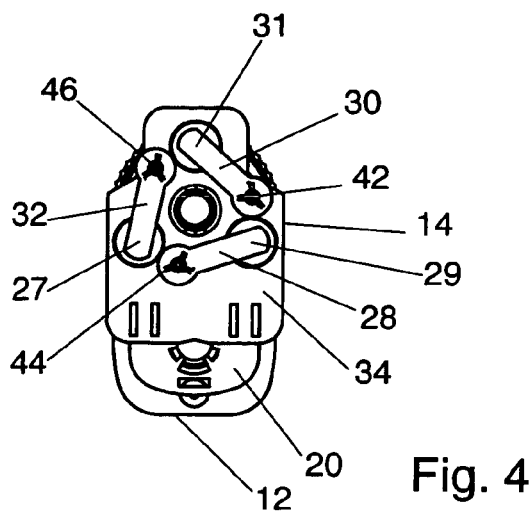

The invention relates to a laser measuring device comprising a housing with a laser transmitter or source contained therein for generating and projecting at least one laser beam perpendicular to an alignment surface of the housing or to an alignment surface of a mount that can be connected to said housing.

From DE-T-694 27 987, a laser measuring device is known, wherein four laser beams that are perpendicular to one another can be generated, which are used for plumbing and leveling. In this divice the laser transmitter that generates the laser beam, which comprises the laser light source and a set of optics, is suspended in a freely floating fashion, in order to achieve an automatic centering of the plumb beam.

Corresponding laser measuring devices can also have a wall bracket that is connected, for example, via magnets to the housing of the laser measuring device, in order to permit the measuring device to be used independently of a stand or other supporting surface. In this, the wall bracket can also be aligned relative to the housing such that the former serves as the mount for a stand.

In JP-A-2000028359 a laser measuring device with three stand legs is described.

Corresponding laser measuring devices are also intended to offer the option of making a marking on the ceiling of a room that is perpendicular to an opening in the floor area of the room, in order, for example, to position an ascending pipe that runs between the two openings. Difficulties frequently arise in this process, because the alignment of the plumb beam in the direction of the ceiling is not sufficiently precise if the extension of the plumb beam, or of another laser beam that extends antiparallel to the plumb beam, does not pass through the center of the opening.

DE-A-33 17 732 relates to a geodetic instrument with a tripod, the feet of which are axially adjustable.

According to DE-A-31 18 822, a directional gyro is equipped with tripod feet that can be swiveled around a horizontally extending axis, and can be extended.

The object of the present invention is to further improve upon a laser measuring device of the type described above such that an exceedingly precise alignment of a laser beam to the center point of an opening in a room boundary, such as the floor, is possible, without requiring time-consuming adjustment operations.

To attain the stated object, the invention provides essentially that at least three synchronously adjustable positioning elements are allocated to the alignment surface, which lie in a circle, wherein the laser beam or its extension passes through the center point of said circle.

In this, each positioning means or element consists essentially of an arm, which can be pivoted around an axis that extends perpendicular to the alignment surface, and which is equipped at its free end with a projection that points away from the alignment surface. The projection can have a cylindrical shape, the longitudinal axis of which extends parallel to the pivoting axis of the arm.

Alternatively, the positioning means or elements can also be equipped with supports that can be adjusted along grooves or sliding slits, which supports can be adjusted via a driver element, which in turn effects the synchronous radial adjustment of the positioning elements, for example via eccentric curves or eccentrically extending grooves.

According to the invention, an automatic centering of the housing, and thereby of the laser beam, is accomplished via the positioning means or elements, which can be aligned with an opening in such a way that the projections extend into said opening, so that when said projections come into contact with the inner walls of the opening, which can also be structured as a pipe, the laser beam automatically passes through the center of the opening. In this, proper building construction is assumed, i.e. the surface in which the opening is found is oriented toward the horizontal to a sufficient extent, so that a marking that extends precisely plumb above the opening can be made with the laser beam on the opposite surface.

The same considerations also apply to boundary surfaces that extend parallel to the vertical, wherein in place of a plumb beam a horizontal beam is used.

According to the invention, using purely mechanical aids, an automatic centering of the laser beam is enabled, so that improper alignment of the laser beam to an opening or some other area of origin by a user operating the laser measuring device is excluded.

The positioning means or elements, which can also be referred to as feet, can be adjusted synchronously and coupled to one another, wherein it is especially provided that a toothed planetary gear that encompasses the pivoting axis concentrically extends from each arm, with said toothed gear engaging with a central toothed sun gear. Said central toothed sun gear can then be adjusted, for example,via a thumb wheel, so that the projections that extend from the arms lie against the inner surface of the opening, and are thus positioned in a circle, the center point of which coincides with the center point of the opening.

In a further development of the invention it is provided that the alignment surface has an opening through which the laser beam or a second laser beam that runs in its extension passes, wherein said opening extends coaxially to the circle in which the positioning elements or their projections lie.

The term circle in this context includes circles of different diameters, based upon the alignment on the diameter of the opening, wherein all the circles have the same center point.

If an adjustment of the positioning elements, i.e. their arms or elements having the same purpose, can be accomplished via a hand adjustment, then it is also possible for at least one of the positioning means or elements to be impinged upon by force or spring-loaded in the direction of the enlarging circular diameter. In this manner an automatic placement of the positioning means or elements, or their projections, on the inner surface of the opening occurs.

If the alignment surface is, for example, the base surface of the housing, this can preferably also be the outer surface of the mount that is connected to the housing. In this, the alignment surface of the mount extends parallel to the base surface of the housing.

The laser device that is arranged in the housing is arranged so as to be automatically centered and especially freely floating. Furthermore, the laser beam generated by the laser light source can be divided into four partial beams that extend perpendicular to one another, two of which extend antiparallel to one another and plumb.

The opening that is present in the alignment surface preferably serves at the same time as a receptacle for a stand. Independently of this, the opening can be penetrated by the additional laser beam that is oriented antiparallel to the laser beam that points away from the positioning elements.

Further details, advantages and characterizing features of the invention result not only from the claims, from the characterizing features found therein—alone or in combination—but also from the following description of a preferred exemplary embodiment depicted in the set of drawings.

Figure 2:
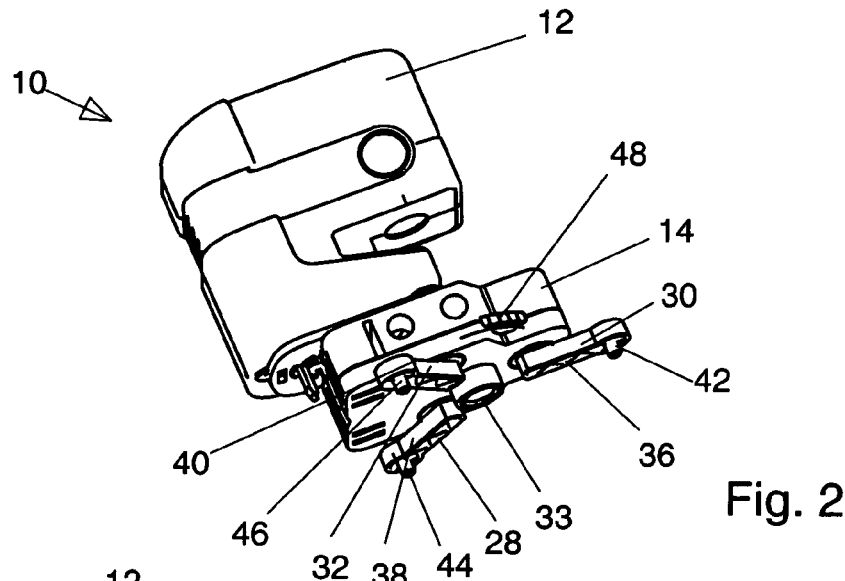
Figure 1:
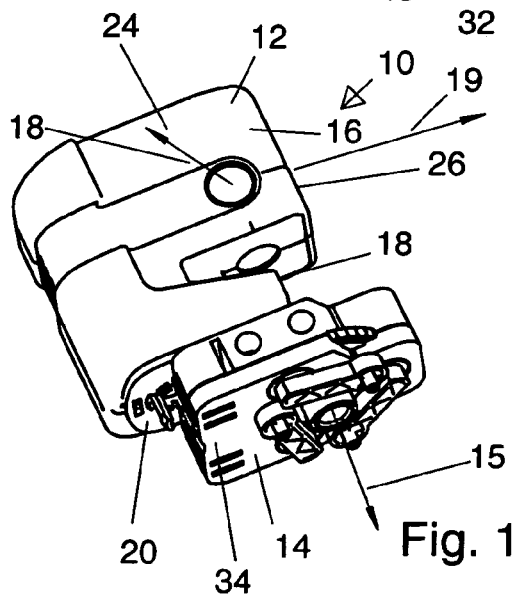

The drawings show:

FIG. 1 a first perspective representation of a laser measuring device with positioning elements pivoted toward the inside, FIG. 2 the laser measuring device according to FIG. 1 with positioning elements pivoted toward the outside.

Figure 5:
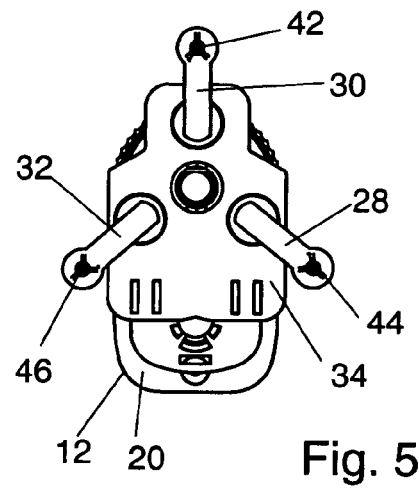
Figure 3:
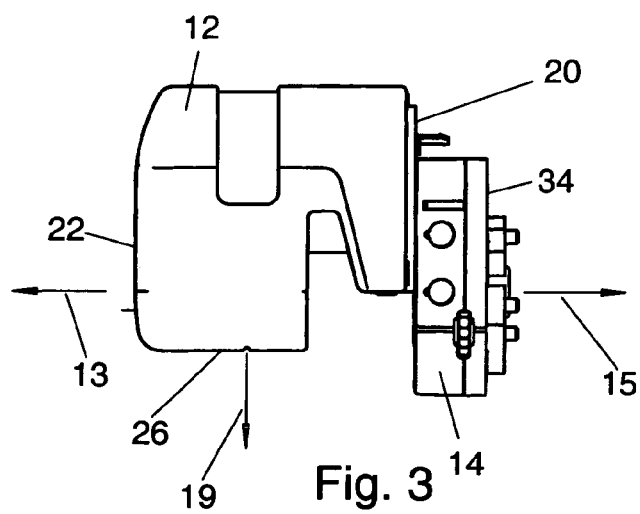
Figure 6:
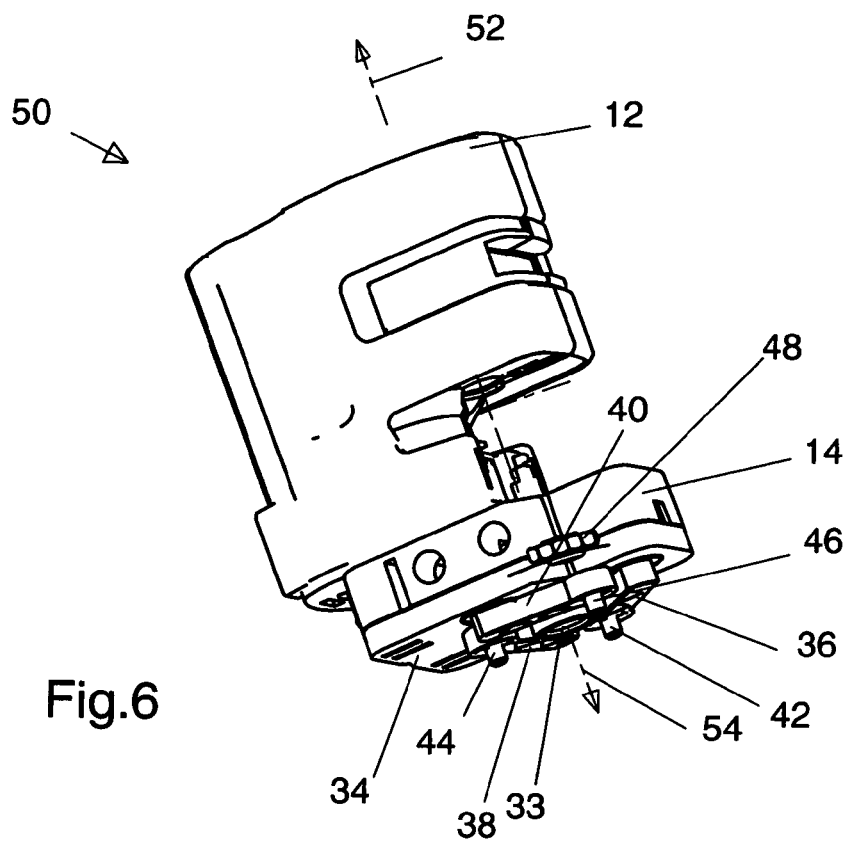
Figure 7:
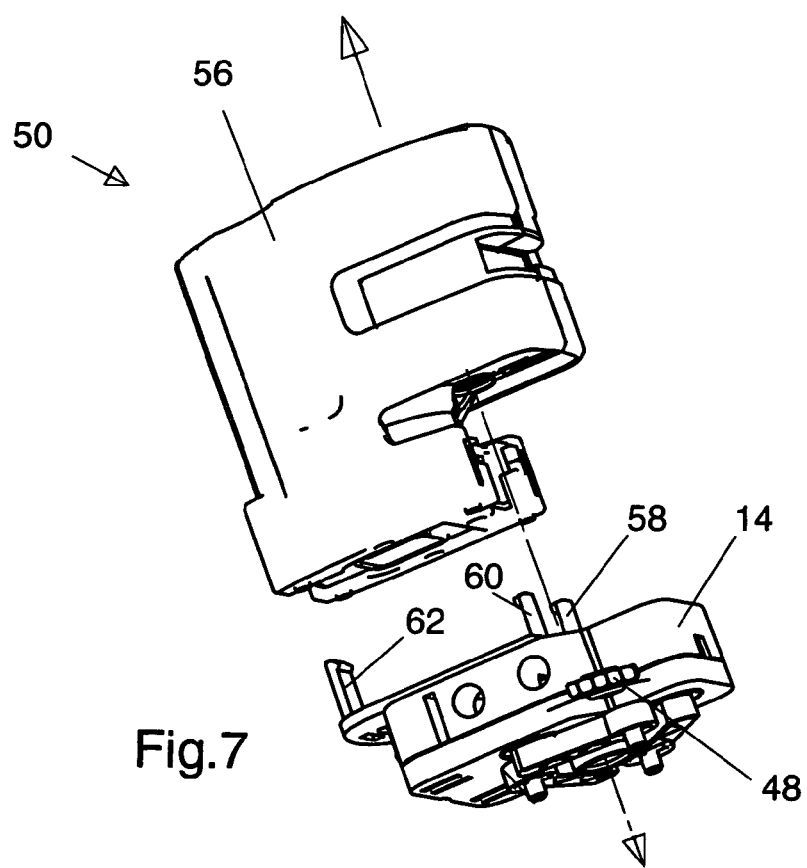
Figure 8:
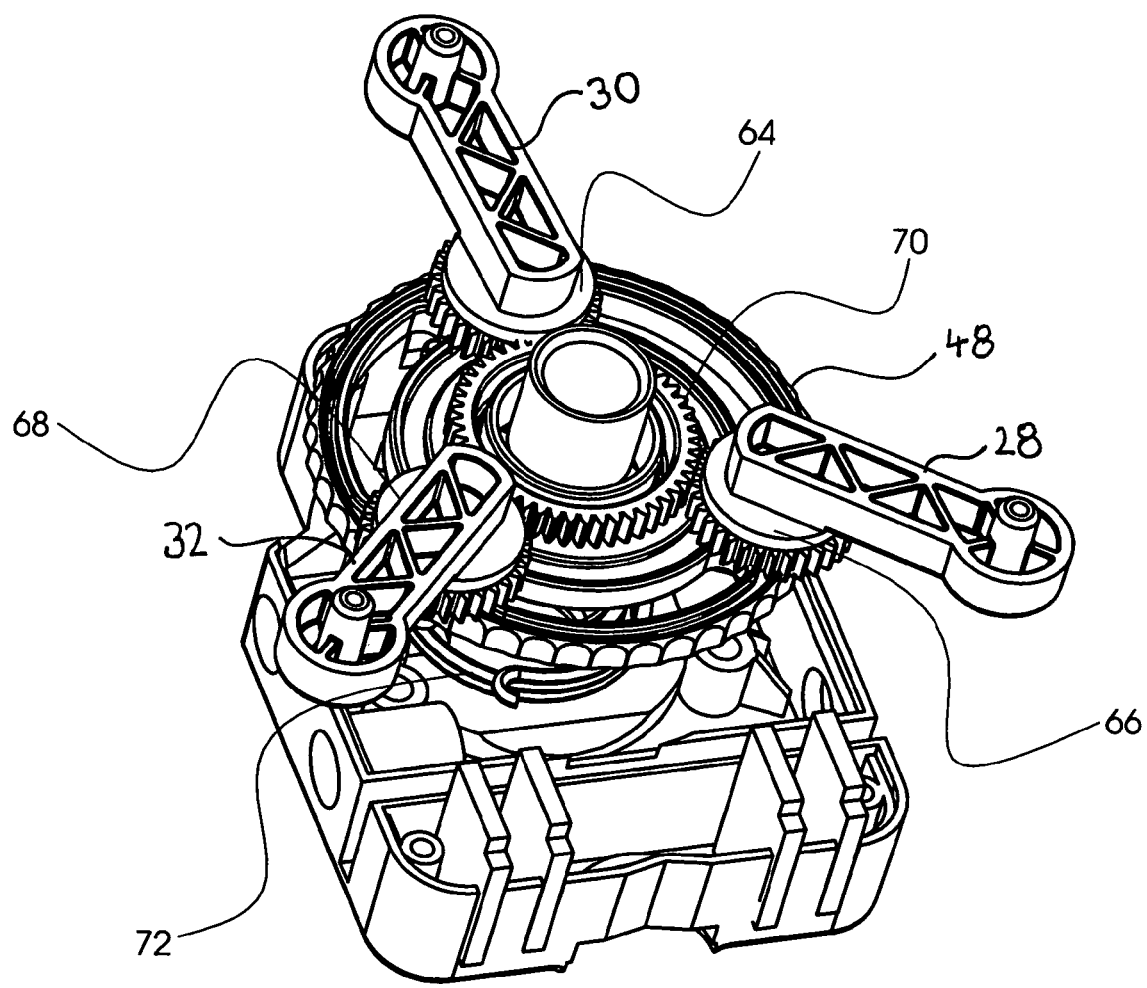

FIG. 3 a side view of the laser measuring device according to FIGS. 1 and 2,

FIG. 4 a bottom view of the laser measuring device with positioning elements pivoted toward the inside, FIG. 5 the bottom view of the laser measuring device according to FIG. 5 with positioning elements pivoted toward the outside, FIG. 6 a further embodiment of a laser measuring device in a perspective representation, FIG. 7 the leaser measuring device according to FIG. 6 in an exploded representation, and FIG. 8 a section of the laser measuring device according to FIG. 1-5.

In FIGS. 1-5, a first embodiment of a laser measuring device 10 is represented generally, which comprises a housing 12, which is separably connected to a mount 14. The connection between the housing 12 and the mount 14 can be implemented via magnets or other connecting elements, without the invention being restricted to this.

The housing 12 is comprised of a top section 16, which is structured to hang over its foot section 18.

The laser measuring device 10, i.e. the housing 12, comprises a laser light source with a set of optics, not shown here, with which the laser beam that is generated by the laser light source is divided into four laser beams 13, 15, 17, 19 that are perpendicular to one another, in order to enable plumbing and leveling.

Two of the four beams extend antiparallel and, when the base surface 20 of the housing 12 is aligned horizontally, plumb, wherein one of the plumb beams 13 passes through the top surface 22 of the housing 12 and the other plumb beam 15 passes through the underside of the overhanging housing 12, and, based upon the extension of the foot section 18, also passes through its base surface 20. A further laser beam 17 that extends perpendicular to these passes through a side panel 24, while the fourth laser beam 19 passes through the end surface 26 of the housing 12. With this type of embodiment of the laser device, however, the teaching of the invention is not limited, even if the division of the laser beam into the four separate perpendicular beams 13, 15, 17, 19 is considered preferable.

In order to utilize the laser measuring device 10 in such a way that the plumb beam 15 can be aligned with the center point of an opening in a floor surface of a room, it is provided according to the invention that positioning means or elements project from an alignment surface of the housing 12 or the mount 14 that extends perpendicular to the plumb beam 15, wherein said positioning elements can be synchronously pivoted, so that when the positioning elements lie against the inner boundary of the openings, an automatic centering of the plumb beam 15 to the center point of the opening is implemented, and thus a marking is made on the surface opposite the floor surface in a plumb extension. The synchronous pivoting is preferably accomplished via a positive coupling of the positioning elements.

If the teaching of the invention with regard to the plumb alignment of openings in a floor and a ceiling boundary of a room is preferably to be used, the same applies to the horizontal alignment of openings in vertically extending boundaries that are spaced from one another. In this case, the laser beam extends horizontally.

In the exemplary embodiment, the positioning means or elements are structured as feet 28, 30, 32, which are capable of pivoting around axes 27, 29, 31 that extend parallel to the plumb beam 15 and thus perpendicular to the alignment surface, which in the exemplary embodiment is the outer surface 34 of the mount 14, which extends parallel to the base surface 20 of the housing 12 or its foot 18.

The feet 28, 30, 32 are comprised of pivotable arms 36, 38, 40, from the end surfaces of which projections 42, 44, 46 extend, each of which is cylindrical in shape with a longitudinal axis, extending parallel to the pivoting axes 27, 29, 30. The feet 28, 30, 32 or arms 36, 38, 40 can be pivoted in a synchronous and positively coupled manner such that, regardless of the pivoting angle, the projections 42, 44, 46 always lie in a circle, wherein circles of different diameters have the same center point. This center point is aligned relative to the plumb beam 15 in such a way that said beam passes through the center point, to the extent that, with the pendulum device suspended in a free-floating fashion, the housing 12, i.e. its base surface 20 or the alignment surface 34 that extends parallel to this, is aligned horizontally. Accordingly, the plane that stretches from the bottom sides of the arms 36, 38, 40, over which the projections 42, 44, 46 reach, extends parallel to the alignment surface 34, and thereby to the base surface 30 of the housing 12.

With these types of measures, an automatic centering of the plumb beam 15 to the center point of an opening, against the inner surfaces of which the projections 42, 44, 46 lie, is accomplished.

In the exemplary embodiment, the pivoting axes 27, 29, 31 of the arms 36, 38, 40 lie in a circle that extends concentrically to an opening 33, which can serve as a mount for a stand, onto which the housing 12 or the mount 14 can be placed or screwed when it is not in use according to the invention.

The positively coupled movement, i.e. the pivoting of the feet 28, 30, 32, is accomplished especially in that a satellite toothed gear 64, 66, 68 extends from each arm 36, 38, 40 (FIG. 8), coaxially encompassing the respective pivoting axis 27, 29, 31. The satellite toothed gears 64, 66, 68, each of the same diameter, then coordinate with a central toothed gear 70, whereby the synchronous movement of the arms 36, 38, 40 that is necessary for the realization of the invention is ensured. The central toothed gear 70 can then be adjusted using a thumb wheel 48 that is accessible from outside the mount 14, in order in this manner to align the projections 42, 44, 46 to an opening or to its inner surface.

Of course, it is also possible for the projections 42, 44, 46 or elements having the same purpose to be automatically placed on the inner surface or walls of an opening. To this end, at least one of the arms 36, 38, 40 can be impinged upon by force in the direction of the larger circular diameter. This can be accomplished via spring pre-stressing. In FIG. 8, this is illustrated by a spring element 72, which acts on the boundary elements 48. Thus the positioning means or elements, in other words the feet 28, 30, 32 used in the exemplary embodiment, exhibit a tendency to automatically pivot toward the outside. Consequently, for an automatic centering it is necessary only for one of the feet to pivot inward against the force of the spring, in order to release the feet 28, 30, 32 once they have been placed over the opening, whereby the automatic centering of the plumb beam 15 on the center point of the opening is accomplished.

The teaching of the invention is suitable for any type of laser measuring device, with which a laser beam is generated that extends perpendicular to the plane that is spanned by positioning means or elements. This will be clarified in principle with reference to FIGS. 6 and 7. In these, the same reference symbols that were used in connection with FIG. 1-4 are used for identical elements.

In this, a measuring device 50 is represented, in which a plumb beam 54 is generated. In the exemplary embodiment, a beam 52 extends antiparallel to the plumb beam 54. This beam 52, and thereby the plumb beam 54, extend perpendicular to the outer surface 34 of the mount 14, and thus to the plane spanned by the free bottom sides of the pivotable arms 36, 38, 40, which are overhung by the projections 42, 44, 46, which have the particular characteristic of being cylindrical in shape.

As FIGS. 6 and 7 illustrate, the housing 56 of the laser measuring device 50 is detachably connected to the mount 14. If a magnetic connection is provided in the exemplary embodiments according to FIG. 1-4, then the mount 14 for the laser measuring device 50 is mechanically connected to the housing 12 via stop fingers 58, 60, 62, as an illustration, purely by way of example, of a possible connection.

The center point of the circles that are spanned by the positioning means or elements 28, 30, 32 extends, according to FIG. 1-4, within the opening 33 in the mount 14. In this, the laser beam 54 passes through the opening 33, and extends antiparallel to the beam 52, which projects from the top surface 22 of the housing 12.

The invention claimed is:

1. A laser measuring device (10,50) comprising a housing (12,56) having a base surface (20,34), a laser transmitter mounted within said housing for generating and projecting at least one laser beam (13, 15, 52, 54) perpendicular to said base surface or a mount (14) connected to the housing, and wherein,
   at least three adjustable positioning elements (28, 30, 32) are mounted on said base surface, said positioning elements being movable or pivotable in respect to said base surface,
   each positioning element (28, 30, 32) comprises an arm (36, 38, 40) having a supporting surface which can be pivoted about an axis (27, 29, 31) that extends perpendicular to the base surface (20, 24) or to a plan that is spanned by supporting surfaces for the arms, and which has adjacent its free end area, a projection (42, 44, 46) that points away from the base surface, said projections lying on a common circle,
   the distance between said positioning elements being movable or pivotable synchronously,
   the positioning elements when moving or pivoting having their projections lying on common circles with different diameters,
   the at least one laser beam extending perpendicular to said base surface and passing through the center of said circles.

2. A laser measuring device according to claim 1, wherein a driver element is attached to each arm, (35,38,40) and arranged coaxially to the pivoting axes (27, 29,31), a synchronizing means rotatable about the center point of the circle coordinating with each of said driver elements.

3. A laser measuring device according to claim 2, wherein the driver elements are satellite planetary toothed gears (64, 66,68) and the synchronizing means is a central toothed gear (70).

4. A laser measuring device according to claim 2, wherein the synchronizing means is connected to an adjustment element (48), that can be actuated from outside the housing (12) or the mount (14).

5. A leaser measuring device as defined in claim 4, wherein the adjustment element (48) is a thumb wheel.

6. A laser measuring device according to claim 1, wherein the positioning element (28,30,32) can be radially adjustable and guided along a groove, a curve, or a slit.

7. A laser measuring device according to claim 6, wherein each of the positioning elements (28,30,32) have a projection (42,44,46), which point away from the base surface.

8. A laser measuring device according to claim 7, wherein the projections (42,44,46 have a cylindrical shape, the longitudinal axes of which extend perpendicular to the base surface (20,34).

9. A laser measuring device according to claim 1, wherein the positioning elements (28,30,32) interact with groove guide elements that follow eccentric curves or curved pathways, for radially synchronous adjustment.

10. A laser measuring device according to claim 1 wherein the base surface (20,34) is provided with an opening (33), through which the laser beam (15,54) passes, and which extends coaxially to the circle in which the positioning elements (28,30,32) or their projections (42,44,46) lie.

11. A laser measuring device according to claim 1, wherein at least one of the positioning elements (28,30,32) is impinged upon by force in the direction of the enlarging circular diameter.

12. A laser measuring device according to claim 11, wherein at least one of the positioning elements (28,30,32) is spring prestressed.

13. A laser measuring device according to claim 1, wherein the base surface is the base surface (20) of the housing (12).

14. A laser measuring device according to claim 1, wherein the base surface is the outer surface of the mount (14) that is connected to the housing (12).

15. A laser measuring device according to claim 1, wherein the laser beam that is generated by the laser transmitter can be divided into four separate laser beams (13, 15, 17, 19) that are perpendicular to one another, and wherein two of said laser beams (52,54) intersect one another as plumb beams (13,15, 17,19), one of which passes through the center point of said circle.

* * * * *